Oct. 16, 1962 S. J. ANGELLO 3,058,854

SEMICONDUCTOR ALLOYS AND METHOD OF PREPARING THE SAME

Original Filed Aug. 20, 1953

WITNESSES:
Bernard R. Giegucz
Leon M. Garman

INVENTOR
Stephen J. Angello
BY
Frederick Shapoe
ATTORNEY

United States Patent Office 3,058,854
Patented Oct. 16, 1962

3,058,854

SEMICONDUCTOR ALLOYS AND METHOD OF PREPARING THE SAME

Stephen J. Angello, 288 Barclay Ave., Pittsburgh 21, Pa.

Original application Aug. 20, 1953, Ser. No. 375,416. Divided and this application July 24, 1957, Ser. No. 673,847

3 Claims. (Cl. 148—1.6)

This invention relates to semiconductor materials such as are used in transistors, and aims to provide alloys suitable for use as semiconductors.

This application is a division of application Serial No. 375,416 of Richard L. Longini and Stephen J. Angello, now abandoned.

A primary object of the invention is to provide a method of producing single crystals of alloys of germanium and silicon in predetermined proportions, which will be useful as semiconductors.

Another important object of the invention is to provide methods of preparing highly uniform semiconductor material formed of germanium and silicon alloys.

These, and other objects and advantages of the invention will become apparent as the description proceeds.

Figure 1:
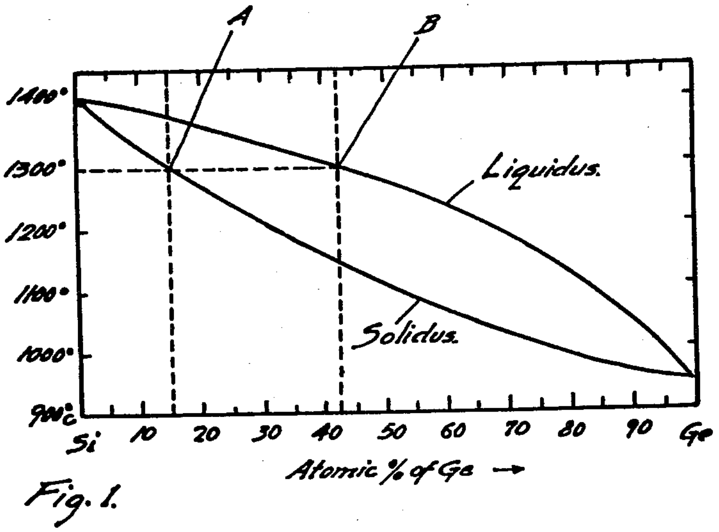
Figure 2:
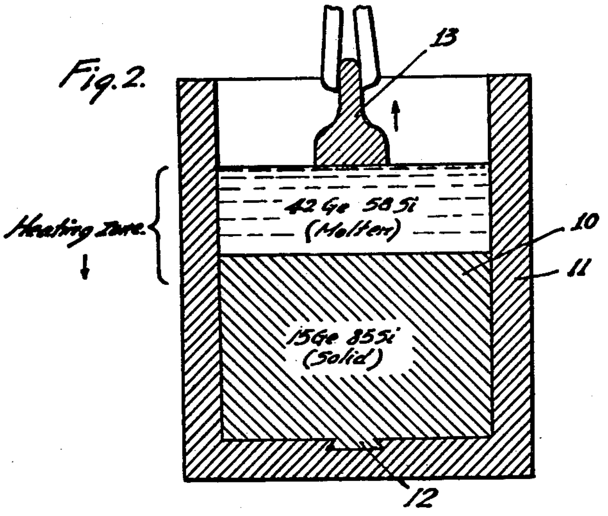

For a better understanding of the nature and objects of the invention reference should be had to the following detailed description and drawing, in which:

FIGURE 1 is a phase diagram of silicon and germanium binary alloys, in which composition is plotted against temperature; and FIG. 2 is a vertical cross section through an apparatus illustrating the growth of a single crystal of a silicon-germanium alloy.

Prior to this invention the only practical semiconductor materials have been the elements silicon and germanium, used separately. These elements have been "doped" with minute amounts of N-type or P-type impurities to produce N-type or P-type material for use in transistors and related devices.

Both of these materials have their advantages and disadvantages. Germanium has a melting point of 960° C. and is therefore relatively easy to melt and crystallize, and when molten it is relatively inert and does not attack the holding vessels. The disadvantages of germanium are that it is a scarce material, and that it loses certain of its semiconducting properties at elevated temperatures, so that it cannot be used in transistors to be operated much above the range of 60° to 100° C.

Silicon has the advantages of being plentiful, and being capable of use above 200° C. Its disadvantages are that it is difficult to handle due to its high melting point, 1420° C., and that it is very active in attacking almost every crucible material at that temperature.

The present invention provides useful alloys of silicon and germanium which have some of the advantages of each of these materials and which avoid most of the disadvantages of each.

It has been found that the alloys may contain from 75% to 90% of silicon, the balance being germanium and incidental impurities. These are the approximate practical working limits, because at 90% silicon the silicon-germanium alloy melts at 1350° C., a worthwhile reduction of melting temperature below that of pure silicon. Above 90% silicon the melting point rapidly approaches that of pure silicon, and the drop in the melting point becomes so small as to be of no practical value.

Below 75% silicon the solidus curve becomes quite horizontal, and it is therefore more difficult to accurately control the ratios of the two metals. Hence, below 75% silicon some of the benefits of the combination are lost without any compensating advantages.

It has been found that the electrical properties of these silicon-germanium alloys are intermediate between those of silicon and germanium, and vary in a linear manner. The approximate energy of activation for different percentages of silicon are as follows:

| | Electron volts |
|---|---|
| 100% silicon | 1.12 |
| 90% silicon | 1.08 |
| 85% silicon | 1.05 |
| 75% silicon | 1.02 |

The melting points, reactive characteristics, and other metallurgical characteristics of the alloys are intermediate between those of silicon and germanium. For example, the alloy containing 85% silicon and 15% germanium melts at approximately 1300° C. Hence, these alloys will have some of the advantages of germanium, since they will be easier to handle than silicon alone, and they will also have some of the advantages of silicon, since transistors using them can be used at higher temperatures than can transistors using germanium alone.

There are, however, some difficulties that must be overcome in making semiconductors from the silicon-germanium alloys of this invention. This is due to the fact that in the range of silicon content disclosed herein, the solid alloys contain a higher percentage of silicon than the corresponding molten alloys at the same temperature. This is clearly shown in FIG. 1, which is a phase diagram of the binary silicon-germanium alloys. In this diagram the base line represents the atomic percentages of germanium in the alloy, and the vertical line represents the temperatures in degrees centigrade. The curve marked "solidus" represents the solid alloy at the particular temperatures, and the curve marked "liquidus" represents the liquid alloy at the particular temperatures. Selecting an alloy containing 15% germanium and 85% silicon, and drawing a vertical line at the point (15% germanium on the base line) represented by this alloy, it will be observed that this vertical line intersects the solidus curve at a point A which corresponds with a temperature of 1300° C. A horizontal line representing this temperature intersects the liquidus curve at point B, which corresponds to an alloy composition of 42% germanium and 58% silicon.

Because of the facts pointed out above, when an alloy composed of 15% germanium and 85% silicon is caused to solidify out of a bath of molten germanium-silicon held at a constant temperature of 1300° C., the molten metal starts with a composition of 42% germanium and 58% silicon. As the 15–85 alloy solidifies out it carries out of the bath a higher percentage of silicon and a lower percentage of germanium than are contained in the liquid phase, and hence the composition of the liquid bath changes as solid alloy is removed. This changing of the composition of the liquid bath would cause corresponding alterations in the composition of the subsequently withdrawn solid.

For use in transistors the alloys should have a highly uniform composition throughout the body of metal used, because with changing composition the crystal structure becomes imperfect. This is due to the fact that in the pure elements the silicon atoms are packed slightly closer in the diamond-type lattice than are germanium atoms, and the silicon-germanium alloys have intermediate spacing of atoms in the lattice. The germanium lattice has a linear spacing 3.7% larger than the spacing in silicon, so that there are approximately 11% more silicon atoms in a cubic centimeter of silicon than there are germanium atoms in a cubic centimeter of germanium. If the composition of the germanium-silicon alloy is closely controlled so that the fluctuations in composition are not over about 2%, there will be less than $2\times10^{13}$ lattice defects per cubic centimeter due to irregular composition. It is desirable to keep the variation of the alloy within these limits, and the present invention includes methods for producing large crystals of the alloy having high purity and high uniformity within these limits.

Crystals of germanium-silicon alloy having the desired qualities of purity and uniformity may be produced by the following process:

By withdrawing a growing crystal from molten alloy. Since this method normally would, as explained above, change the composition of the liquid melt, steps are taken to maintain the melt at approximately its starting composition.

Thus, if the desired crystal is to contain 15% germanium and 85% silicon, a seed crystal of this composition is dipped into the melt and withdrawn slowly from it. As it is withdrawn an alloy of the same composition as the withdrawn crystal is added to the melt at the same rate the crystal is withdrawn, thus maintaining the melt at its starting composition, namely, 42% germanium and 58% silicon. This may be done by slowly lowering a rod of the 15–85 alloy into the melt at one side of the crucible.

Another method of replenishing the molten bath is shown in FIG. 2, in which a solid ingot 10 to 15% germanium and 85% silicon is secured to the bottom of a crucible 11, as by a dovetail 12. Heat is applied to the upper end of the ingot to produce a molten bath having the 42–58 composition. This heating zone is moved downwardly as the growing crystal 13 of 15–85 composition is withdrawn from the bath. The heating zone is moved downwardly at a rate properly coordinated with the rate of withdrawal of the crystal to maintain the molten bath at the desired 42–58 composition.

If the rate of adding the 15–85 alloy to a molten bath is closely controlled, and other conditions, such as the temperature of the bath and the rate of withdrawal of the crystal are also closely controlled, the variations in the composition of the resulting crystal can be kept within the 2% limit discussed above.

Another method of maintaining the starting composition of the melt is to maintain at all times an excess of silicon in the bath, while maintaining the bath at a constant temperature. As the metals are removed from the melt by the withdrawing crystal, enough of the excess silicon will dissolve into the melt to keep its composition constant, until that point is reached at which the bath will finally be depleted of germanium. The seed crystal will produce a large single crystal of the desired silicon-germanium alloy composition.

In the above description the alloy having the composition 15% germanium and 85% silicon was used as an example. It should be understood, however, that the same principles apply to any alloy within the range of 75% to 90% silicon, balance germanium and incidental impurities.

The starting charge may of course be "doped" with the desired impurity so that the final alloy crystal will have the desired N-type or P-type characteristics.

The percentages expressed herein are atomic percentages.

According to the provisions of the patent statutes, I have explained the principle of my invention and have illustrated and described what I now consider to represent its best embodiment. However, it is to be understood that, within the scope of the appended claims, the invention may be practiced otherwise than as specifically illustrated and described.

I claim as my invention:

1. The method of producing an alloy of from 75% to 90% by weight of silicon and the balance being germanium of substantially uniform composition which comprises: preparing a molten pool having a selected composition of silicon and germanium; maintaining the pool at a constant temperature corresponding to the liquidus temperature of the selected germanium-silicon composition; cooling one portion of the molten pool to produce at said portion a solid body of silicon-germanium alloy having a higher percentage of silicon than is contained in the molten pool; and continually adding silicon to the molten pool material to replenish the supply of silicon therein in direct proportion to the silicon solidifying out of the pool in the alloy at said one portion, thereby maintaining the composition of the molten pool constant.

2. The method of producing an alloy of silicon and germanium of substantially uniform composition which comprises: preparing a molten pool having a selected composition of silicon and germanium; maintaining the pool at a constant temperature corresponding to the liquidus temperature of the selected germanium-silicon composition; cooling one end of the molten pool to produce at said end a solid body of silicon-germanium alloy having a higher percentage of silicon than is contained in the molten pool; and making available to the molten pool an excess of silicon, whereby silicon will dissolve into the molten pool as needed to maintain the composition of the molten pool constant at the liquidus composition at said temperature as solid silicon-germanium composition is solidified out of the molten pool.

3. The method of producing a silicon-germanium single crystal alloy of homogeneous composition which comprises the steps of providing a saturated molten pool of silicon-germanium alloy, crystallizing from said pool a homogeneous single crystal having a higher percent of silicon than said pool while maintaining said pool at a temperature at which the desired crystal composition will be obtained, and replenishing the silicon in said molten pool by maintaining a source of solid silicon in contact therewith thereby maintaining said molten pool in a saturated condition at the said temperature.

No references cited.